April 22, 1952   J. V. CAMMARATO   2,593,533
PROTECTOR FOR GAS CYLINDER VALVES
Filed May 22, 1950   2 SHEETS—SHEET 1
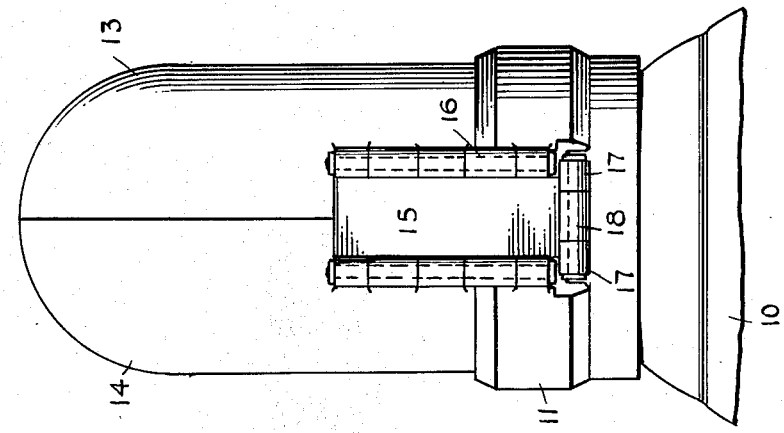
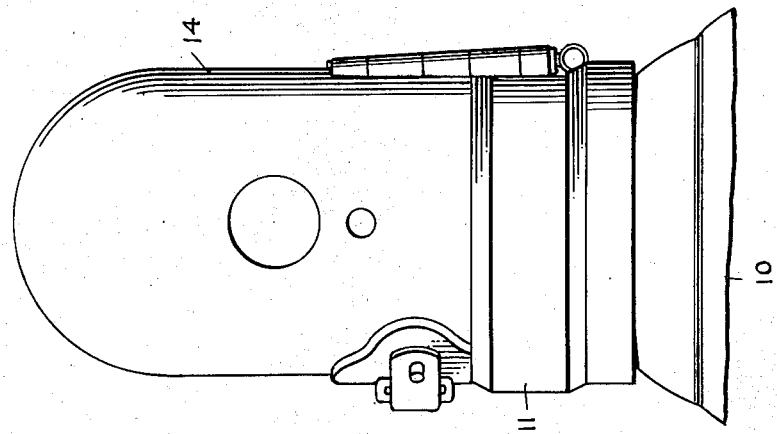
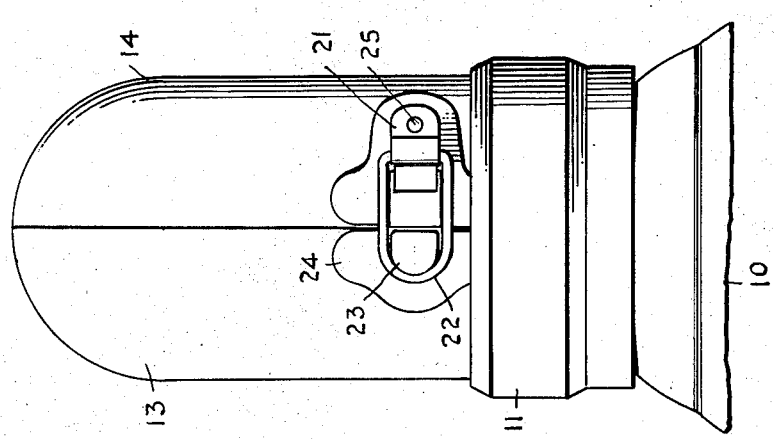
INVENTOR.
JAMES V. CAMMARATO
ATTORNEYS.

April 22, 1952   J. V. CAMMARATO   2,593,533
PROTECTOR FOR GAS-CYLINDER VALVES
Filed May 22, 1950   2 SHEETS—SHEET 2
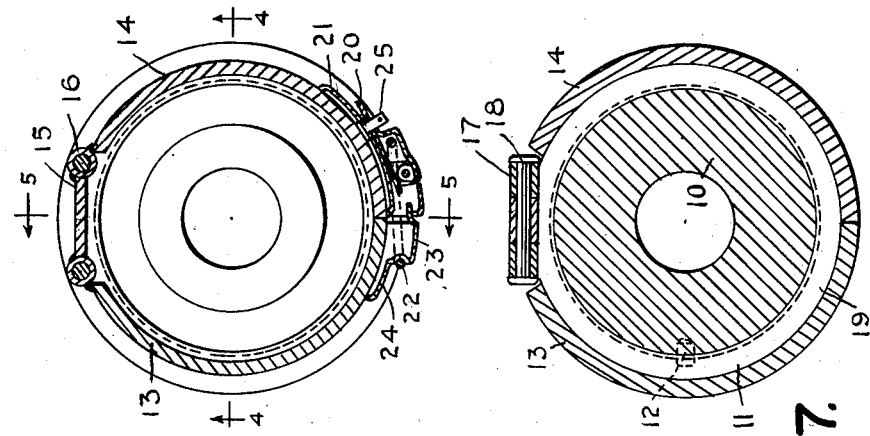
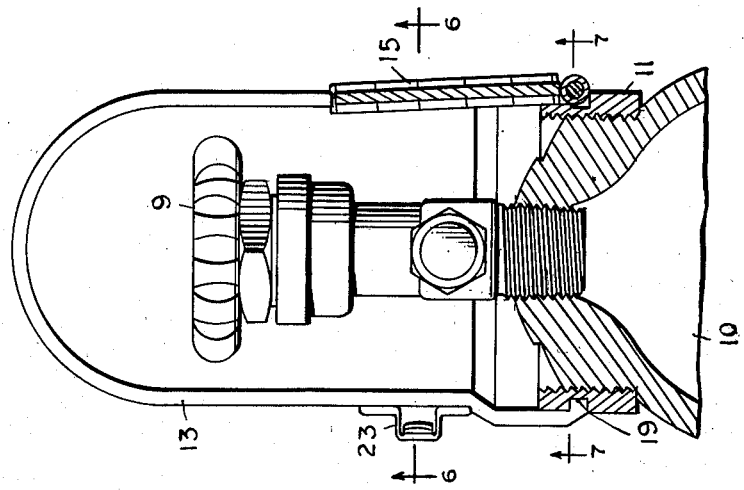
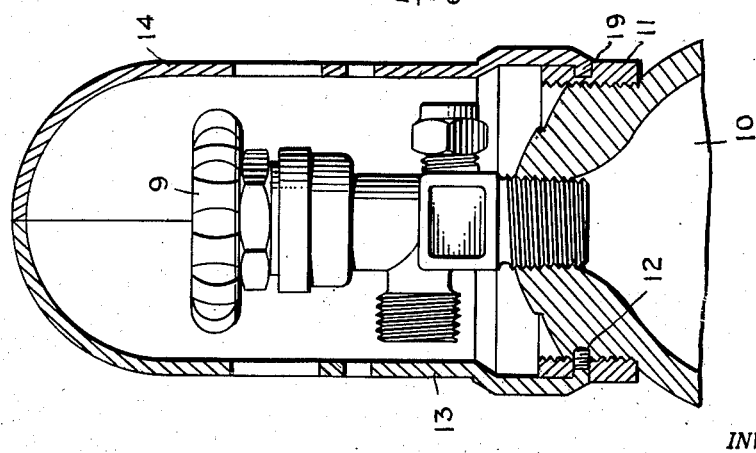
INVENTOR.
JAMES V. CAMMARATO
ATTORNEYS.

Patented Apr. 22, 1952

2,593,533

UNITED STATES PATENT OFFICE 2,593,533

PROTECTOR FOR GAS CYLINDER VALVES

James V. Cammarato, Washington, D. C.

Application May 22, 1950, Serial No. 163,394

3 Claims. (Cl. 220—85)

This invention relates to devices for protecting the valves of storage cylinders for transporting and delivering highly compressed gases, such as oxygen, carbon dioxide, acetylene and other gases commonly stored under pressure.

Such cylinders are heavy and in handling them to and from the filling station and place of use the valve, which is usually screwed in place in the nose or upper tapered end of the cylinder, is likely to be subjected to abuse if it is not protected by a substantial cover. Heretofore it has been customary to screw a cap over the valve to protect it during transportation of the cylinder, but such a cap must be removed in order to get access to the valve to discharge the contents or refill the container and this takes time, the threads of the cap and neck of the cylinder become corroded from use, and many caps are lost in service.

A principal object of the invention is to provide a permanently attached protecting cover for the valve of a compressed gas storage cylinder which may be readily opened and closed and is not subject to injury or derangement, and which may be applied to existing containers in place of the customary screw cap, as well as to new containers.

A further object of the invention is to provide means for sealing the cover in closed position to prevent tampering with the valve in transit and theft or accidental loss of any part of the contents of the cylinder.

Other objects and advantages of the invention appear in connection with the following description of an illustrative embodiment of the invention as shown in the accompanying drawings, and what the invention comprises is set forth in the appended claims.

In the drawings, wherein the same parts are designated by the same reference characters in the several views, Figure 1 is a front elevation of a safety protecting cover or cap for a gas cylinder provided with a screw thread around its neck of a common type now in use for holding compressed gases; Figures 2 and 3 are respectively a side elevation and a rear elevation of the same; Figures 4 and 5 are vertical cross sections of the same on the lines 4—4 and 5—5, respectively in Figure 6; and Figures 6 and 7 are horizontal cross-sections thereof on the lines 6—6 and 7—7, respectively, in Figure 5; the cover being shown in closed position in all of the views.

The form of the protecting device shown in the drawings is made in two halves to embrace the valve 9 of usual construction, and is secured to the gas container cylinder 10 by means of a screw ring 11 which is normally retained in assembled position on the threaded neck of the cylinder by means of a set-screw 12, but which cover can be removed for repair or replacement by unscrewing the set-screw 12 and rotating the ring and parts carried thereby in the direction to unscrew the ring from the neck of the cylinder. In closed position of the device the set-screw 12 is covered by the lower edge of one of the halves 13 of the cover portion of the device and so cannot be removed, thus preventing removal of the screw-ring 11 and valve cover.

The two halves 13, 14 of the cover are hinged to a hinge plate 15 at the rear of the device by means of vertical pintles 16, the hinge plate in turn being hinged to spaced lugs 17 on the ring 11 by means of a horizontal pintle 18. In closed position the inwardly flanged lower edges of the hinged cover halves 13, 14, which engage in a groove 19 encircling the ring 11, overlie the ends of the pintle 18 and prevent it from being driven out of place; and the lugs 17 on the ring project under the lower ends of the pintles 16 and prevent them from being removed downwardly. These pintles cannot be removed upwardly and so both sets of hinges are secured against disassembling when the cover halves are in closed position. By opening the cover halves and swinging them to the rear and downwards on the horizontal hinge, the ends of the pintle 17 are exposed and the latter can be driven out to permit removal of the plate 15 and the parts supported thereby from the ring, thereby also permitting disassembling the pintles 16 and cover halves 13, 14 from the plate 15.

The mating halves 13, 14 of the protective device completely enclose the valve 9 when closed, and are secured in closed position by means of a latch consisting of a handle 20 pivoted to a fitting 21 welded to one of the cover halves 14, and having a bail 22 pivoted thereto which catches over an abutment 23 on a fitting 24 welded to the other cover half 13, as clearly shown in Figures 1 and 5 of the drawings. A stud 25, rigidly secured to the fitting 21, projects through an aperture in the handle 20 and has a transverse hole through its end for receiving a wire seal to prevent unlatching the device after the cylinder has been filled with gas.

Obviously, when the halves 13, 14 of the protecting device are closed with their inwardly flanged lower edges engaging in the groove 19 and the latch 20 and bail 21 securing them together it is impossible to get access to the valve 9 to tamper with it, and the valve is also protected against accidental injury. Upon breaking the wire seal and unlatching the two cover halves, the latter may be swung apart horizontally on their vertical pintles 16 sufficiently for their flanged lower edges to disengage the groove 19 and permit both halves and the back hinge plate 15 to be swung on the horizontal pintle 18 downwards to the rear until they lie below the level of the ring 11 to expose the valve 9 on all sides.

The invention may be applied to new cylinders by making the ring 11 integral therewith, as by welding, or by cutting the groove 19 directly in the metal of the cylinder itself and welding on the hinge parts 17, as will be readily understood by those skilled in the mechanical arts.

The invention is not restricted to the mechanical details of the form of protecting device shown, but what I claim is as follows:

1. A protective device for the valves of portable gas containers comprising a ring for encircling the neck of the container, said ring being provided with an encircling groove, a hinge plate hingedly secured at its lower end to said ring to swing about an axis in the plane of the ring transverse to a diameter thereof, two cover sections respectively hinged to said hinge plate to swing about axes substantially perpendicular to the axis of the hinge connecting said plate to said ring, the lower edges of said cover sections being provided with inwardly extending flanges adapted to engage in closed position thereof in the groove in said ring, and means adapted to engage the edges of said cover sections remote from said hinges for securing said cover sections together.

2. A protective device as set forth in claim 1 wherein the means for securing the cover sections together comprises a handle member pivoted to one of said sections and adapted to engage with a keeper receiving member for retaining it against operation to release said cover sections.

3. A protective device as set forth in claim 1 wherein the ring is provided with internal screw threads for engaging the threads on the container, a securing device located in the groove of the ring for engaging the container to prevent unscrewing the ring, and means on said cover sections for retaining said securing device in engagement with said container when said cover sections are in closed position.

JAMES V. CAMMARATO.

REFERENCES CITED

The following references are of record in the file of this patent:

UNITED STATES PATENTS

| Number | Name | Date |
| --- | --- | --- |
| 472,192 | Loring | Apr. 5, 1892 |
| 1,948,966 | Jaeger | Feb. 27, 1934 |
| 2,080,728 | MacNeill et al. | May 18, 1937 |